Feb. 27, 1934.  B. R. SHOVER  1,948,804
SCREW-DOWN
Filed Feb. 1, 1932  3 Sheets-Sheet 1
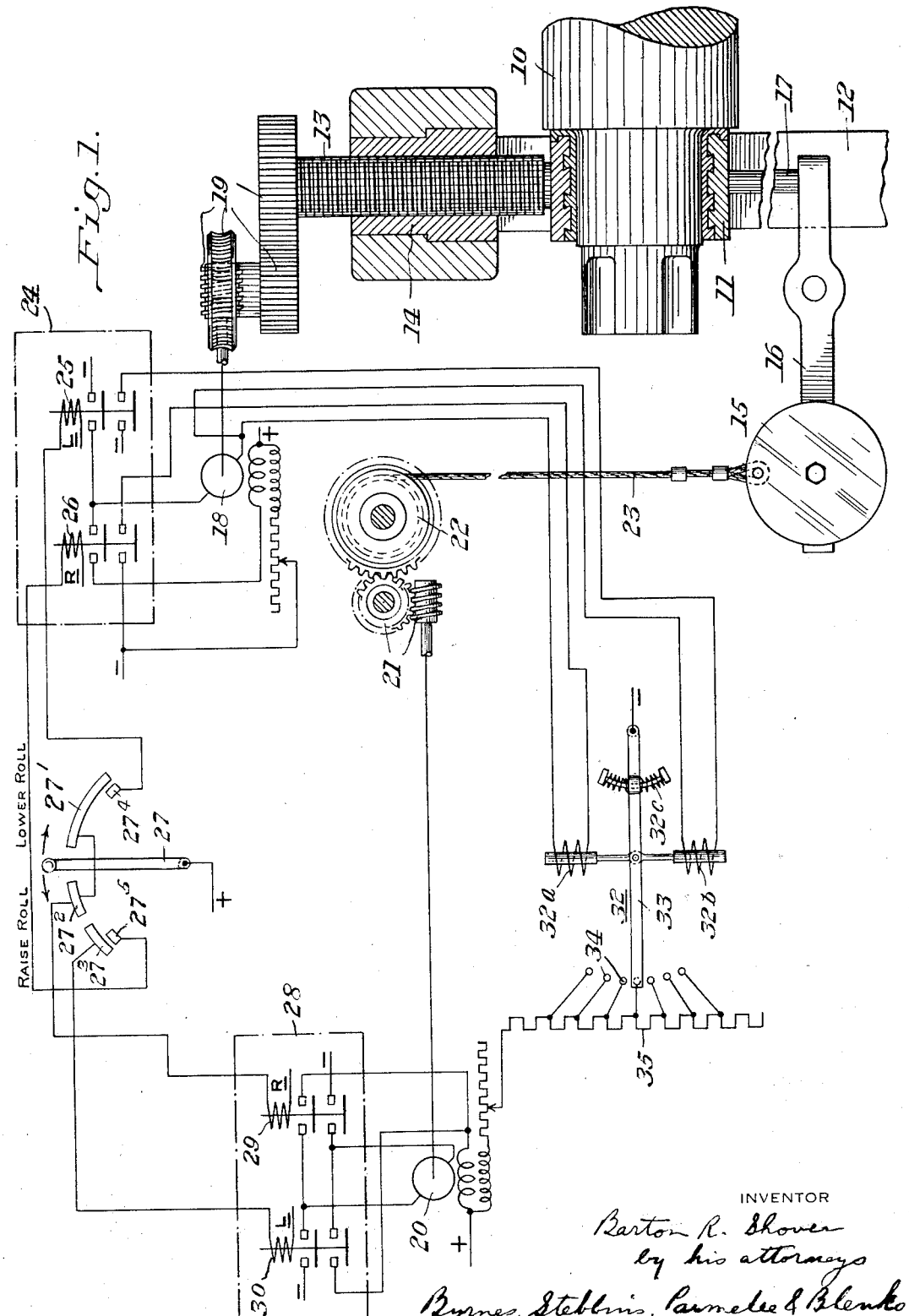

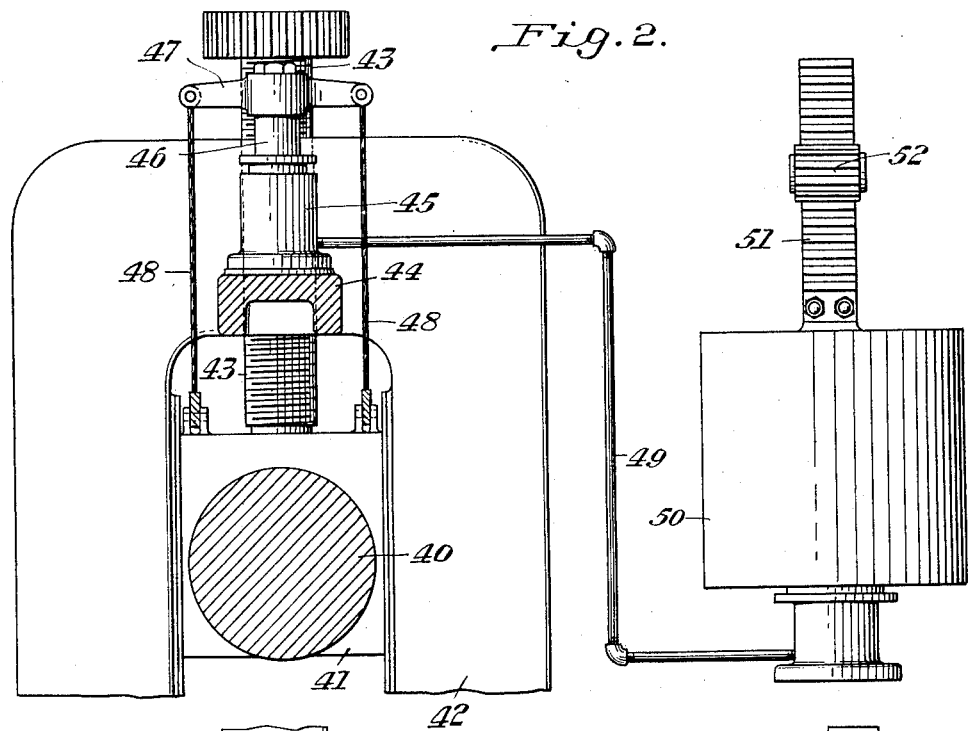
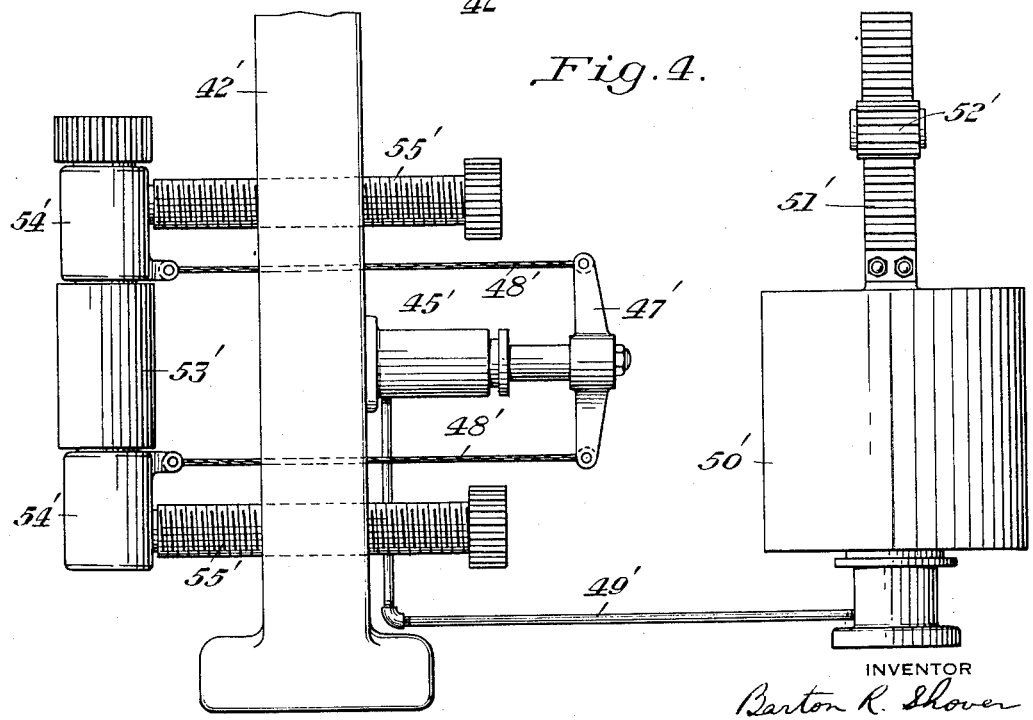

Feb. 27, 1934.  B. R. SHOVER  1,948,804
SCREW-DOWN
Filed Feb. 1, 1932  3 Sheets-Sheet 3

INVENTOR
Barton R. Shover
by his attorneys
Byrnes, Stebbins, Parmelee & Blenko

Patented Feb. 27, 1934

1,948,804

UNITED STATES PATENT OFFICE 1,948,804

SCREW-DOWN

Barton R. Shover, Pittsburgh, Pa.

Application February 1, 1932. Serial No. 590,132

6 Claims. (Cl. 80—56)

My invention relates to the adjusting screw-downs for rolling mills and, in particular, to a method and apparatus for operating the counterbalance or other means which is usually employed to maintain the roll bearings in contact with the adjusting screws.

In rolling mills, it has heretofore been the practice, where the top roll is designed for vertical adjustment to produce varying reductions in the rolled material, to counterbalance or otherwise urge the roll necks against their bearings so that the latter will be maintained in engagement with the adjusting screws. The total counterbalance weight or bearing retracting effort should be sufficiently greater than the weight of the roll and bearing boxes to prevent the top roll from "jumping" when the material enters the pass. In addition to counterweights, hydraulic pressure has been used for this purpose, as well as springs.

The adjusting screws themselves are generally driven by an electric motor, although other drives have been employed. Obviously, the screw-down motors in lowering the rolls, must perform the work necessary to raise the excess weight of the counterbalance or to oppose the retracting force. It is found in practice, however, that the motor must be of much greater capacity than that necessary to perform this work. The reason therefor is the fact that the pressure of the counterbalance or the equivalent thereof on the bearing boxes increases greatly the friction of the screws in their nuts. The same result is observed in raising the rolls. The friction of the screws in their nuts is further increased by the fact that the screw pitch must necessarily be small to prevent the screw from backing up under the heavy roll pressures encountered, and the thread section and diameter of the screw must be sufficient to withstand such pressure.

Rapid and frequent operation of the screw-downs is required in order to maintain the desired rate of production, and the low power-transmission efficiency of the screws, due to the frictional effects resulting from the counterbalance pressure, necessitates that the screw-down motors be of a capacity greatly in excess of that required to perform the actual work of raising and lowering the unbalanced weight. In several installations, two 100 H. P. motors mechanically connected have been used to operate roll screw-downs, the motors being connected in series when lowering the roll and in parallel when raising it. The actual load on the motors in operation exceeded their rating, although the useful work performed was probably not in excess of one-fifth the rating of the motors.

I have invented a method and apparatus for operating screw-downs by which the effect of the counterbalance is temporarily removed to permit operation of the screw-downs without the excessive friction which has heretofore been the cause of the large power requirements in screw-down operating mechanisms. According to my invention, when lowering the roll, I lift the counterweight before starting the screw-downs. The only friction on the screws, therefore, is that caused by their own weight, which is, of course, very much less than that due to the counterbalance. When the screw-downs have been lowered to the proper extent, the effect of the counterbalance is restored to maintain the roll necks against their bearings and the latter firmly against the screws. The raising of the roll may be accomplished in two ways. The screws may be started first and the counterbalance later, so that except for the period of starting the screws, the operation of the latter is not affected by the counterbalance. Another sequence of operations includes the releasing of the counterbalance before starting the upward adjustment of the screws. This eliminates the necessity for starting the screws under the weight of the counterbalance and is somewhat to be desired on that account, in preference to the first-mentioned sequence.

The invention is not limited to mills in which the screw-downs are motor operated or the rolls maintained against the screws by counterbalancing. The invention is also applicable to screw-downs regardless of the power employed for driving them and is also independent of the means for maintaining the roll necks against their bearings and the latter against the screws, whether counterbalancing, hydraulic pressure, springs, or the like. The invention is also applicable to vertical rolls, as well as to horizontal rolls, although, obviously, the problem is not so serious in the adjustment of vertical rolls.

For a complete understanding of the invention, reference is made to the accompanying drawings, illustrating a present preferred embodiment of the invention, together with modifications.

In the drawings,

Figure 1 illustrates diagrammatically one end of a horizontal roll and the counterbalance and screw-down therefor, together with the electrical circuits and apparatus involved in the control of the roll adjustment;

Figure 2 is a view similar to Figure 1, showing hydraulic means for maintaining the roll bearings against the screws, to which the invention is also applicable;

Figure 4 shows a hydraulic system for vertical rolls; and

Figure 3:
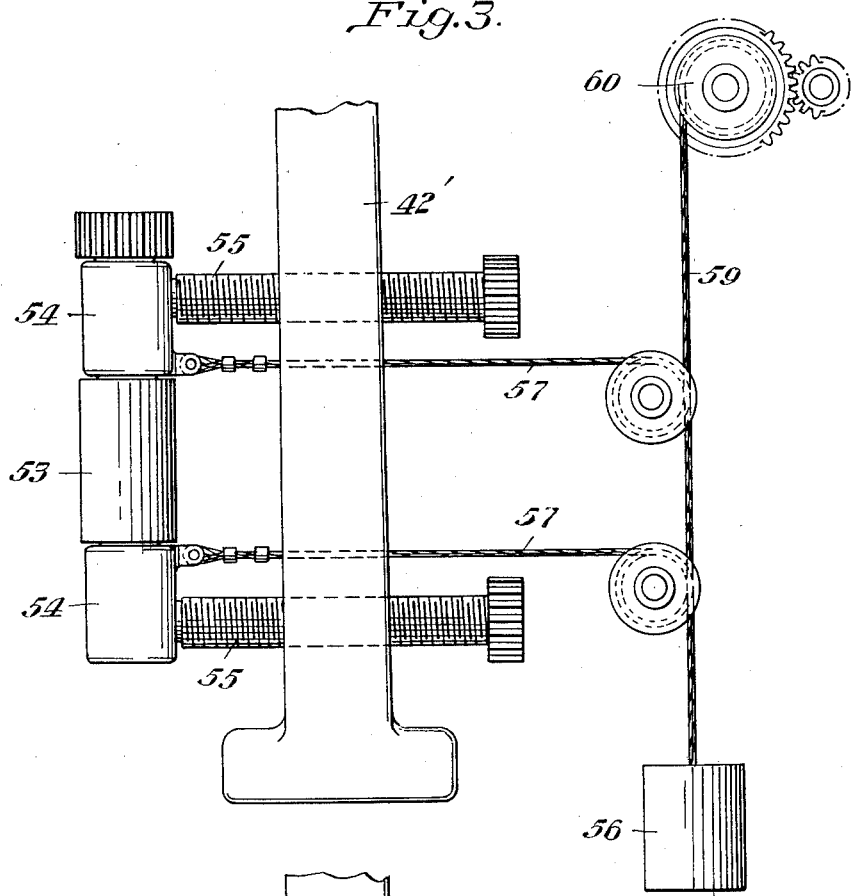
Figure 3 shows a counterweight for a vertical roll.

Referring now in detail to the drawings and, in particular, to Figure 1, one end of a top or vertically adjustable horizontal roll 10 of a rolling mill is journaled in a bearing box 11. The box is adjustable vertically in guides in the roll housing 12. A screw-down 13 traverses a nut 14 in the housing and engages the roll neck bearing at each end of the roll to determine the proper adjustment thereof with respect to the bottom roll (not shown). The bearing 11, except in the case of roller bearings, is divided horizontally into two parts. The lower part is maintained against the roll neck, the roll neck against the upper part and the upper part against the screw 13 by a counterweight 15, mounted on a pivoted lever 16, and acting through a strut 17. Both ends of the roll 10 are provided with the same adjusting and counterweight equipment which is mechanically interconnected, so the description is limited to one end only.

The construction described above compensates for wear on the roll necks and bearings and thus maintains the top roll against the upper part of the bearing 11 and the bearing against the screw 13. The bearings for the top roll are thus maintained against the adjusting screws at all times to prevent the top roll from "jumping" or striking a violent blow against the lower ends of the screws when material is fed between the rolls.

For driving the screws 13, I provide a driving motor 18 connected to the screws by speed reducing gearing 19. A motor 20, through suitable gearing 21, drives a drum 22 for winding up a cable 23 connected to the counterweight 15. As stated above, the screws at opposite ends of the rolls are mechanically interconnected and the same is true of the strut. The invention is applicable, however, to mills having separate motors for driving the screws at opposite ends of the roll.

The motor 18 is controlled by a reversing controller of any desired construction which may be mounted on a panel indicated at 24. In order to avoid the rather lengthy and complex description of known control circuits, I have illustrated on the panel 24 only contactors 25 and 26, which, when energized, complete circuits for the motor 18 so as to lower and raise the adjusting screws, respectively. The relays 25 and 26 are controlled by a switch 27 adapted to engage fixed contacts indicated by the reference numeral applied to the switch in general, plus superscripts 1 through 5.

The switch 27 also controls the motor 20 for operating the counterweights. The control system for this motor is indicated on the panel 28 on which are mounted relays 29 and 30. It is to be understood, of course, that the usual reversing controllers for the motors 18 and 20 will include apparatus other than the relays shown herein. The present disclosure is intended to show the system in its simplest form.

In order to coordinate properly the speed of the motors 20 with that of the motors 18, I provide a relay 32, having windings $32a$ and $32b$ connected in series with the main circuit of the motor 18. The relay 32 has a pivoted contact arm 33 adapted to engage a plurality of fixed contacts 34 connected to successive points on a resistor 35 in the circuit of the field winding of the motor 20. Both the motor 18 and the motor 20 may be of any type, but, as an example, are shown as compound-wound machines having the usual shunt-field rheostats. The resistor and contacts 34 constitute an additional shunt-field rheostat for the motor 20 so that the speed of the latter may be controlled in accordance with the current supplied to the motor 18. The reason for this arrangement will become apparent shortly. The contact arms 33 of the relays 32 are normally centered by a centering spring $32c$.

The operation of the system shown in Figure 1 is as follows. When it is desired to lower the roll 10, the switch 27 is shifted so that it engages the contact $27^1$. The relay 29 on the panel 28 is energized by the completion of an obvious energizing circuit, and by closing its contacts, completes the circuit of the series field and armature of the motor 20. The counterweight is thus raised so that the force urging the bearing box 11 against the adjusting screw is relieved. On further movement of the switch 27, it engages its contact $27^4$. This energizes the relay 25 and the closing of the contacts of the latter complete the circuit for the series field and armature of the motor 18. Since the motor 20 is started first, the motor 18 has only to overcome the sliding friction of the screws in their bearings, caused by their own weight. Obviously, a considerably greater starting effort would be necessary if the screws were started while the counterweight remained effective.

If the motor 20 is adjusted to a speed sufficient to keep the strut 17 lowering ahead of the screw 13, the adjustment will proceed to the desired extent. If the screw 13 overtakes the bearing 11 as the latter is being lowered by the raising of the counterweight, the increased friction will tend to slow down the motor 18, which will then draw an increased current from the source. This current traverses the winding $32b$ of the relay 32. The increased current traversing this relay winding draws the relay contact arm downward to insert additional resistance in the shunt field circuit of the motor 20. This accelerates the motor 20 so as to relieve the motor 18 of the additional friction load introduced when the counterweight is not raised fast enough so that the bearing box descends ahead of the adjusting screw.

When the desired adjustment of the roll has been completed, the switch 27 may be restored to neutral. When the motors are stopped, the screw 13 does not engage the bearing box 11 because of the lead attained by the latter in the downward adjustment. A slight reverse movement of the counterweight motor will correct this condition.

The counterweight motor may be reversed by shifting the switch 27 into engagement with its contact $27^3$. The relay 30 is thereby energized to lower the counterweight to the desired position whereupon the switch 27 may be restored to neutral. The above described reversal of the counterweight motor necessitates that the switch 27 engage momentarily the contact $27^2$ but that this engagement may be made so short, by moving the switch rapidly, that the motor is not operated thereby.

When it is desired to raise the roll, I prefer to raise the counterweight slightly at first, to relieve the screw motor of the excessive friction caused thereby. The switch 27 is shifted to engage its contact $27^2$ whereupon the relay 29 is energized to cause the motor 20 to raise the counterweight slightly. Further movement of the switch causes it to engage its contact 27³ to energize the relay 30 and still further movement causes it to engage the contact 27⁵ to energize the relay 26. The relays 30 and 26 being energized substantially simultaneously, the screw motor 18 raises the screw and the counterweight motor 20 lowers the counterweight. If the speed of lowering the counterweight should exceed the speed of raising of the screw so as to throw additional load on the screw motor because of the friction caused thereby, the increased current drawn by the motor 18 energizes the relay winding 32a to lift the relay arm 33. This reduces the resistance in the shuntfield winding of the motor 20 so as to slow it down. When the desired adjustment of the roll has been made, the switch 27 is restored to neutral. In so doing, it will be desirable to let the switch dwell for an instant in engagement with the contact 27³ alone so as to lower the counterweight to its final position, wherein it forces the bearing box against the adjusting screw. The switch may then be moved over the contact 27² so rapidly that the counterweight motor is not energized.

If a simpler system is desired, the contacts 27¹, 27² and 27³ may be omitted and the contacts 27⁴ and 27⁵ utilized to simultaneously energize relays 25 and 29, and 26 and 30, respectively. In this case, however, the screw motor is always called upon to start the screw against the opposition of the considerable friction introduced by the counterweight.

If it is desired to make this system largely automatic so that careful manipulation of the switch 27 by the operator will not be necessary, it is possible to do this by using a switch similar to 27 for energizing the relay for starting the counterweight motor to raise the counterweight, and by employing a series relay in this motor circuit for energizing the screw motor subsequently to lowering the screws. In the reverse operation, the master controller or switch similar to 27 would energize the relay for causing the counterweight motor to raise the counterweight. A series relay in this motor circuit could be employed to subsequently reverse the counterweight motor and simultaneously start the screw motor so that it would raise the screws. Suitable interlocking between forward and reverse circuits for the screw and counterweight motors might also be included.

It will be apparent that this system provides very flexible means for controlling the movement of the adjustable roll with a minimum power expenditure. The movements of the roll and counterweight are always under positive control and may be effected simultaneously or individually in the former case, the relative speeds of the motors are always controlled by the relay 32.

Figure 2 shows a hydraulic system for holding the upper roll against the screw-down. The roll 40 is journaled in bearings 41 which are slidable vertically in housings 42. Screw-downs 43 may be motor-driven as in Figure 1 or may be actuated by any other means such as a rack bar and piston reciprocating in a fluid cylinder. A transom 44 extends between housings and supports cylinders 45. Pistons 46 in the cylinders carry yokes 47 connected by cables 48 to the boxes 41. A pipe line 49 connects the cylinders 45 to an accumulator 50 including a weight (not shown) resting on a body of fluid therein, and a rack 51 and pinion 52 for raising the weight to release the pressure. The pinion 52 may be driven by a motor such as the motor 18 in Figure 1.

The apparatus shown in Figure 2 may be controlled by exactly the same equipment utilized in Figure 1. This equipment, therefore, has not been duplicated in Figure 2. The motor 20 may be started to raise the weight from the accumulator 50 to permit downward movement of the boxes 41. The motor 18 may then be started to lower the screws. The speed control for the motor 20 operates in the same manner. A reversal of the cycle necessitates only that the accumulator weight be raised temporarily to permit the elevation of the screws to be started without the extra load thereon introduced by the upward thrust on the boxes 41. The screws may then be raised and the accumulator weight lowered to raise the boxes 41 up to the limit determined by the final position of the screws. The motor 20 may also be used to force the accumulator weight down to provide the necessary pressure for raising the roll.

Figure 3 shows how the invention may be applied to vertical rolls. A vertical roll 53 is mounted in bearings 54. Screws 55 permit lateral adjustment of the bearings and these screws may be driven by a motor similar to 18. The bearings 54 are normally pulled close against the screws 55 by a counterweight 56 having cable connections 57 to the bearings traversing pulleys 58. The counterweight 56 may be raised by a cable 59 extending to a drum 60 which may be driven by a mechanism similar to that for raising the counterweight in Figure 1. The same driving and controlling equipment may be used as in Figure 1 and the operating cycle is similar.

Figure 4 illustrates the use of the hydraulic system of Figure 2 for the vertical roll system shown in Figure 3. Reference numerals corresponding to those of Figures 2 and 3 with primes affixed indicate in Figure 4 similar elements thereof. The construction and operation will be obvious without further description.

Figure 5:
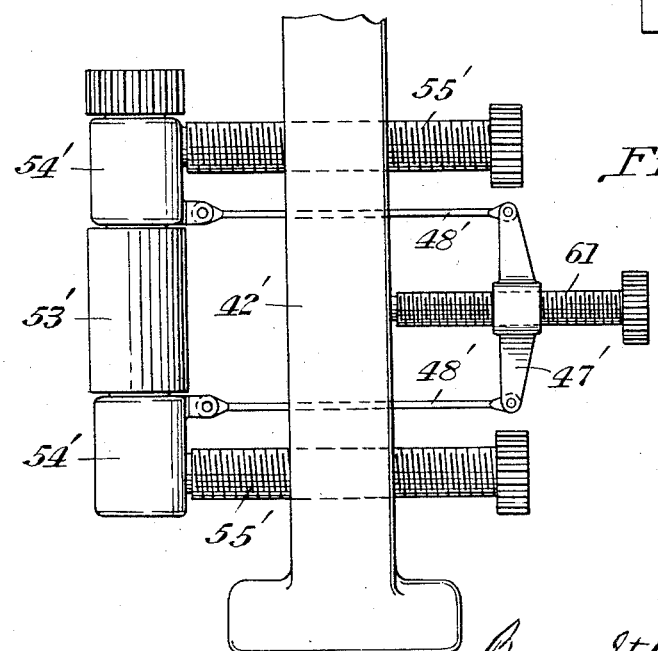
Figure 5 shows a screw for pulling the vertical roll back, as well as the usual screws advancing it.

Figure 5 is similar to Figure 4 except that a screw 61 serves to pull the bearings 54' back against the screws 55' instead of a hydraulic cylinder. The connections 48' between the yoke 47' and the bearings 54' may be rigid instead of flexible if desired. The screws 61 may be driven by a motor similar to 20 which may be controlled as already explained, to release the outward pull on the bearings when the screws are being adjusted.

It will be apparent from the foregoing that the invention gives rise to several outstanding advantages in operating roll adjusting screws. In the first place, the screw motors need only be a fraction of the capacity now considered necessary. The power consumption of the screw adjusting mechanism is greatly reduced. The life of the mechanism is greatly increased, particularly that of the screws and nuts, because the friction is reduced to a minimum. Because of the reduction in the friction, the screws start and stop more smoothly than heretofore. The adjustments of the roll screws can be effected in much less time than has previously been necessary.

Although I have illustrated but one preferred embodiment of the invention, together with certain modifications thereof, it will be apparent that it may be otherwise practiced and embodied in different forms. For example, the roll might be counterbalanced by weights less than the total weight of the roll and a cable employed to pull down the counterweight to raise the roll. Another possible modification would be to counterbalance the roll exactly and have separate cables for raising and lowering the balanced system or instead of cables, a rack and pinion or other rigid connection might be used. The invention may be applied to 3-high, 4-high and other types of mills, as well as to the 2-high mill as shown in the drawings. Such changes in the method and apparatus disclosed may be made, of course, without departing from the spirit of the invention or the scope of the claims.

I claim:

1. The combination with a roll, an adjustable bearing therefor, a screw for holding said bearing, a counterweight for holding the bearing against the screw, a motor for shifting the screw, a motor for lifting the counterweight, and means responsive to the current supplied to the screw motor for accelerating the counterweight raising motor.

2. A rolling mill including a roll, an adjustable bearing for the roll, an adjusting screw for backing up the bearing, means for retracting the bearing against the screw, a motor for driving the adjusting screw, a second motor for rendering the bearing retracting means ineffective, common control means for starting said motors in predetermined sequence, and means for automatically controlling the second motor to insure a predetermined spacing between the screw and bearing while the screw is being adjusted.

3. In a rolling mill, a roll, a screw-down, a screw-down motor, means for maintaining the roll against the screw-down, means for rendering said aforementioned means ineffective, and common control mechanism for successively operating said last-mentioned means and said screw-down motor.

4. In a rolling mill, a roll journaled in the bearings, screws for adjusting said bearings, a motor for driving said screws, means for normally retracting the bearings against the screws, a motor for releasing said retracting means, and common control means for successively starting said releasing motor and said screw motor.

5. In a rolling mill, a roll journaled in bearings, screws for adjusting said bearings, a motor for operating the adjusting screws, means for retracting the bearings against the screws, a motor for releasing the retracting means, means for starting said motors successively, and means for maintaining a predetermined spaced relation between the screws and the bearings during the operation of said motors.

6. In a rolling mill, a roll, an adjustable bearing for the roll, a screw for adjusting the roll bearing, a weight for exerting a force to hold the bearing against the screw, a motor for driving the screw, and a motor for applying a lifting force directly to the weight permitting the bearing to leave the screw and facilitating operation of the screw by said first-mentioned motor.

BARTON R. SHOVER.